United States Patent [19]

Buxton

[11] 4,449,028
[45] May 15, 1984

[54] MONITORING CIRCUITS FOR ELECTRICAL WELDING APPARATUS

[75] Inventor: Keith Buxton, Mansfield, England

[73] Assignee: Metal Box Limited, Reading, England

[21] Appl. No.: 296,506

[22] Filed: Aug. 26, 1981

[30] Foreign Application Priority Data

Sep. 1, 1980 [GB] United Kingdom ............... 8028204

[51] Int. Cl.³ ............................................. B23K 11/24
[52] U.S. Cl. ..................................... 219/109; 219/64
[58] Field of Search ......................... 219/109, 110, 64; 324/64, 83 Q

[56] References Cited

U.S. PATENT DOCUMENTS 3,389,239 6/1968 Treppa et al. ..................... 219/110
4,242,561 12/1980 Long ................................... 219/64

Primary Examiner—B. A. Reynolds
Assistant Examiner—Alfred S. Keve
Attorney, Agent, or Firm—Diller, Ramik & Wight

[57] ABSTRACT

A monitoring circuit for an a.c. resistance welding apparatus for can bodies is arranged to produce an output signal which is representative of the integral with respect to time of the resistive or in-phase component of the welding voltage taken over the half-cycles of welding current. The output signal is representative of the energy expended during welding, and may be used for indication or control.

15 Claims, 6 Drawing Figures

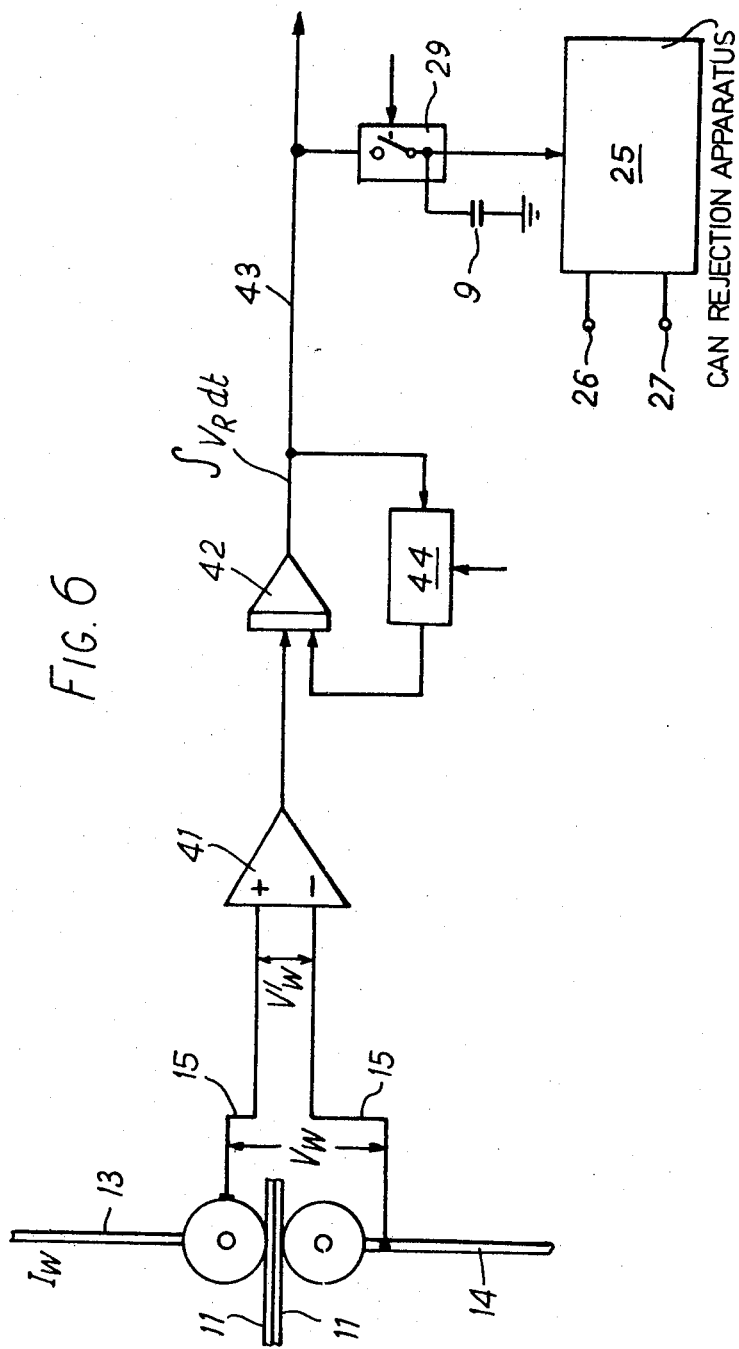

MONITORING CIRCUITS FOR ELECTRICAL WELDING APPARATUS

This invention relates to electric welding, in particular (but not exclusively) the a.c. resistance welding of the longitudinal seams of tubular bodies for three-piece cans.

The effective or in-phase voltage across the electrodes of a can seam a.c. resistance welding apparatus is accompanied by a reactive voltage which is associated with the a.c. supply circuit to the electrodes, in particular the distributed inductance of the supply busbars. In addition, any attempt to monitor the welding voltage will almost unavoidably be attended by a further reactive voltage induced in the pick-up connections of the monitoring circuit itself. The welding voltage as monitored will therefore be formed of the effective or in-phase component in relation to which the monitoring is required, and a reactive component which may be substantially larger than the resistive component so as to mask the resistive component in the monitored welding voltage.

The present invention seeks to provide a monitoring circuit for the weld voltage of an electric welding apparatus, which is capable of deriving from the weld voltage a signal representative of only the resistive or in-phase component of the weld voltage, and/or a signal representative of the integral with respect to time of only the resistive or in-phase component.

Accordingly, from one aspect there is provided a monitoring circuit for monitoring the resistive or in-phase component of the weld voltage of an a.c. resistance welding apparatus, which comprises first means for deriving a voltage in quadrature phase relation to the resistive component, and summing means for summing the quadrature voltage and the monitored weld voltage in such manner that the reactive component of the monitored weld voltage is substantialy cancelled by the quadrature voltage, and for producing an output signal representative of their sum, said output signal being thereby representative substantially only of the resistive or in-phase component of the weld voltage.

According to the invention from another aspect there is provided a monitoring circuit for monitoring the resistive or in-phase component of the weld voltage of an a.c. resistance welding apparatus, which comprises an integrator arranged for integrating the monitored weld voltage with respect to time and for producing an output signal representative of the integral, the integral comprising substantially only the resistive or in-phase component of the weld voltage.

In order that the invention may be more fully understood, embodiments thereof will now be described, by way of example, with reference to the accompanying drawings, in which:

FIG. 1 diagrammatically shows a first monitoring circuit in accordance with the invention, in relation to the wheel electrodes and supply busbars of a can seam resistance welding apparatus;

FIGS. 2, 3 and 4 show various waveforms used in the monitoring circuit, in their phase relation to the welding current;

FIG. 5 diamgrammatically shows the second monitoring circuit in accordance with the invention, being the circuit of FIG. 1 modified to provide automatic compensation for variations in magnetic permeability as welding progresses, and FIG. 6 diamgrammatically shows the third monitoring circuit in accordance with the invention.

Referring firstly to FIG. 1, a monitoring circuit is shown for deriving a signal representative of the resistive or in-phase component $V_R$ of the voltage across the wheel electrodes 10 of a can body seam welding apparatus such as is sold in UK by Soudronic AG under the type designations ABM and FBB. The wheels are shown when the apparatus is in operation, that is, in relation to a pair of overlapped marginal edges 11 destined to form the side seam of a tinplate body of a three-piece can. The body is tubular and open-ended, the lower wheel 10 moving along its inside as the seam is progressively formed along its length.

The seam is formed by resistance welding using an a.c. electrical supply. Accordingly, and in known manner, it is formed of a succession of regularly spaced but overlapping weld "nuggets" each created during a respective half-cycle of the a.c. waveform.

Although not apparent from the drawing, the supply circuit is conventional. It has a rotary frequency converter fed from a standard 3-phase a.c. supply and having a single-phase output winding with an earthed centre-tapping. A welding transformer connected across this winding supplies the wheels 10 through the upper and lower busbars 13,14 shown in the drawing. A pair of inverse-parallel connected thyristors is connected into circuit between the rotary converter and the welding transformer, and controllable to provide phase angle control of the welding current and so regulate the electrical energy used per nugget.

The monitoring circuit is connected for receiving the weld voltage $V_W$ on leads 15, and has a differential amplifier 16 with the leads 15 connected across its input terminals. The weld voltage $V_W$ as it appears on the leads 15 is formed of the resistive or in-phase component $V_R$ with the addition of a substantially larger inductive component $V_L$ due to the distributed circuit inductance between the monitoring points. In addition, voltage $V_E$ will unavoidably be electromagnetically induced on the leads 15 themselves; this voltage may, in relative terms, be substantial.

The voltage appearing at the input to the amplifier 16, accordingly equal to $V_R+V_L+V_E$ (or $V_W+V_E$), is denoted in FIG. 1 by the reference numeral $V'_W$. It is hereinafter referred to as the "monitored weld voltage".

A search coil 17 is inductively coupled to the supply circuit at the upper busbar 13 (where it is substantially unaffected by variable magnetic permeability effects of the can body), and provides its output voltage $V_S$ as the input to a second differential amplifier 18. It will be noted in passing that $V_S$ is essentially inductive and therefore in-phase with the reactive component $(V_L+V_E)$ of the monitored weld voltage $V'_W$.

The amplifiers 16,18 feed their outputs to a summator 19 which accordingly produces an output signal representative of their difference.

The gains of the amplifiers 16,18 are so relatively chosen that the voltage $V_S$ from the search coil, after amplification in the amplifier 18, is approximately equal in magnitude to the reactive component of the voltage $V'_W$, after amplification in the amplifier 16, over the whole of each half-cycle of their waveform. Accordingly, the output from the summator 19 is representative substantially solely of the resistive or in-phase component $V_R$ of the weld voltage $V_W$; after suitable amplification in a further amplifier 21 it may therefore be used as such for indication and/or control on a line 22. (The summator 19 and amplifier 21 will usually be combined as a differential amplifier).

Advantageously, and as shown, the output from the amplifier 21 is passed through an integrator 23 which integrates it with respect to time to produce on a line 24 a signal representative of $\int V_R \, dt$. For a constant value of weld current $I_W$ this integral is representative of electrical energy expended in the welding operation. The integrator is reset by a resetting circuit 28 prior to each half-cycle of the current $I_W$, so that as a seam is being welded there appears on the line 24 a train of signals indicative of the electrical energies used for the individual nuggets of the seam. These signals are passed to a circuit 29 which, in known manner, samples their final absolute values and holds the samples on a capacitor 9 until updated by the next signal to arrive.

Statistically it is known that for satisfactory nugget formation the energy used should lie within predetermined upper and lower limits. Cans which have one or more nugget energy values lying outside this range are automatically rejected by can rejection apparatus 25 responsive to the output signal from the sample and hold circuit 29. The apparatus 25 may have provision for an operator to alter the limits after visual (or other) inspection of the welded can bodies; accordingly, it has inputs 26,27 at which the upper and lower limits (in suitable form) can respectively be entered.

The signal on the line 24 may be used for indication and/or control functions other than the rejection of defective can bodies as described.

FIGS. 2 to 4 show two successive half-cycles of various voltage waveforms illustrating the operation of the monitoring circuit. For the purposes of comparison the weld current $I_W$ is shown in dashed line in FIG. 2 when superimposed upon the monitored weld voltage $V'_W$ which is seen to be largely reactive. The welding current falls naturally to zero at the positions indicated $I_{WO}$ on the waveform, the following rise being delayed artificially, to the positions denoted $I_{WB}$, by the phase angle control previously mentioned.

Because of the leakage inductance in the welding transformer a small voltage exists during the time that the phase angle control is effective, i.e. between the positions $I_{WO}$ and $I_{WB}$ on the waveform. This voltage is ignored by the integrator 23 in its determination of $V_R \, dt$.

The derivation of the resistive or in-phase component $V_R$ of the weld voltage $V_W$ as described above is on the assumption that the magnetic permeability in the welding voltage pick-up area is constant. However, with the monitoring circuit shown in FIG. 1, variations in this magnetic permeability may in some applications affect the magnitudes of the reactive voltages $V_R$ and $V_E$ from one nugget to the next, to such a degree that the output signal from the summator 19 include a substantial reactive or out-of-phase component. In particular, the signal on the line 24 will then be unreliable as a measure of the electrical energy used per nugget. In order to improve the approximation of the voltage generated by the amplifier 18 to the reactive component $(V_L + V_E)$ of the monitored weld voltage $V'_W$, the monitoring circuit of FIG. 1 may be modified as shown in FIG. 5 to provide automatic compensation for magnetic permeability variations by controlling the gain of the amplifier 18.

Figure 5:
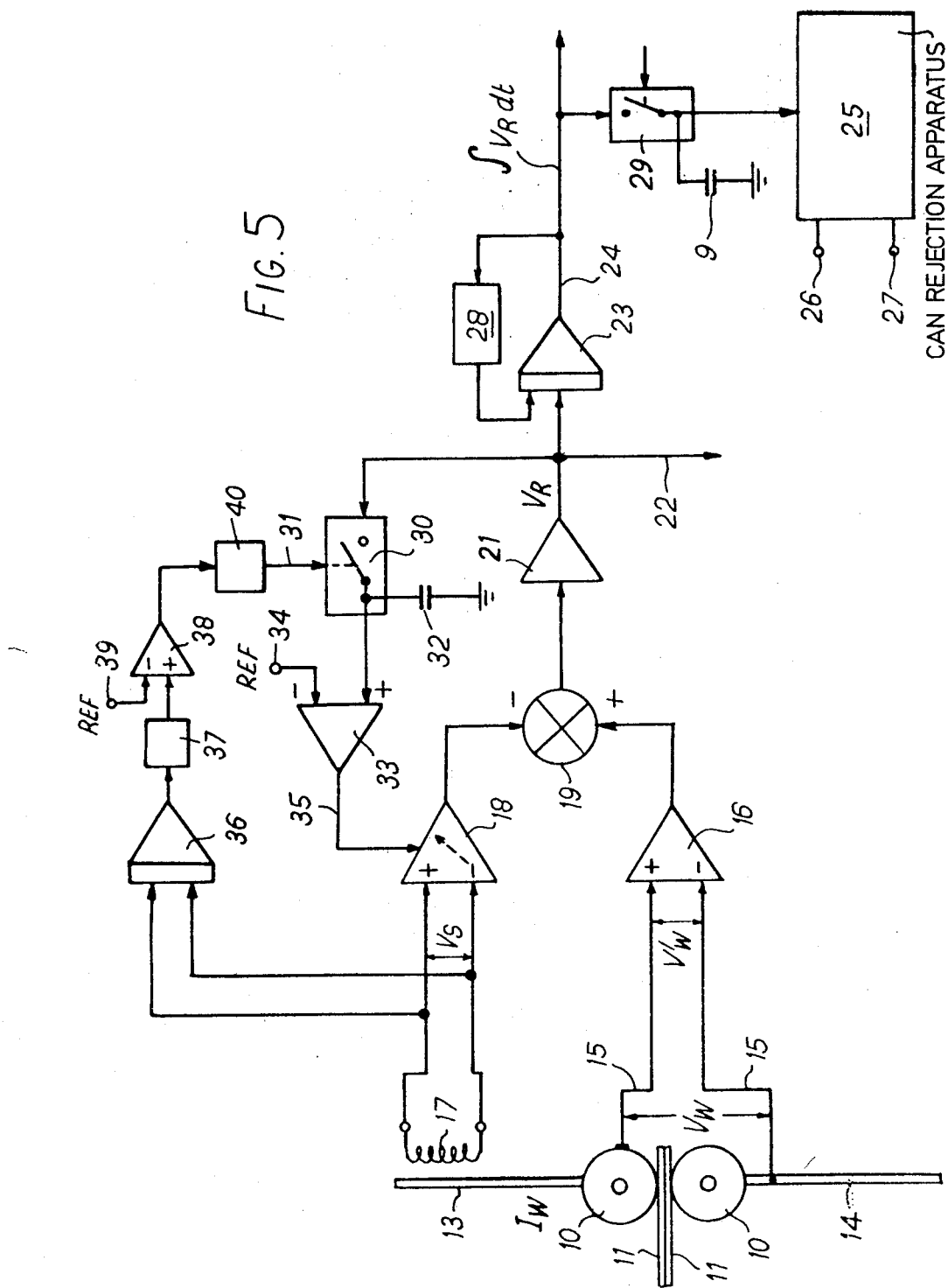

Referring now to FIG. 5, in addition to the items already described with reference to FIG. 1 the monitoring circuit includes a sample and hold circuit 30 controlled by pulses on line 31 and having a holding capacitor 32, and a comparator 33 connected for receiving the output of the sample and hold circuit and arranged to compare it with a reference value at terminal 34 and produce an error-dependent signal on line 35. The amplifier 18 is connected to the line 35 for receiving the error-dependant signal on the line 35 and arranged to vary its gain in accordance with that signal.

The timing of the pulses on line 31 is such that the sample and hold circuit 30 is controlled to sample the final absolute values of the $V_R$-dependant pulses from the amplifier 21 at the end of each half-wave of the welding current $I_W$. Thereafter it holds the samples in turn on capacitor 32 as its output to the comparator 33. Usually the signal at terminal 34 will represent zero voltage, and it will therefore be understood that in response to the pulses on line 31 the gain of amplifier 18 is repeatedly controlled in the sense to remove any residual of the $V_R$-dependant signal which may exist at the beginning of the periods of phase angle control (i.e. during zero current conditions).

The production of the pulses on line 31 for controlling the sample and hold circuit 30 is produced by a serial arrangement of an integrator 36 connected across the search coil 17 for receiving the search coil voltage $V_S$, a rectifying circuit 37 arranged to produce an absolute value signal from the alternating output of the integrator, a comparator 38 arranged to compare the output of the circuit 37 with a reference signal at terminal 39 which is small in relation to the average value of the absolute value signal, and to produce a constant output signal during the periods that the reference signal is exceeded, and a monostable circuit 40 triggered by the trailing edges of the square wave pulses produced by the comparator 38 to produce short-duration pulses as the pulses on the line 31.

Figure 3:
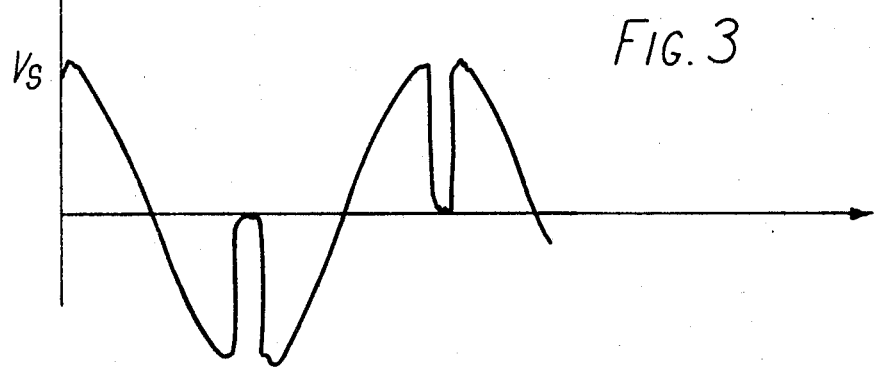
FIG. 3 shows the induced voltage $V_S$ across search coil 17 to be very similar in form to the monitored weld voltage $V'_W$.
Figure 4:
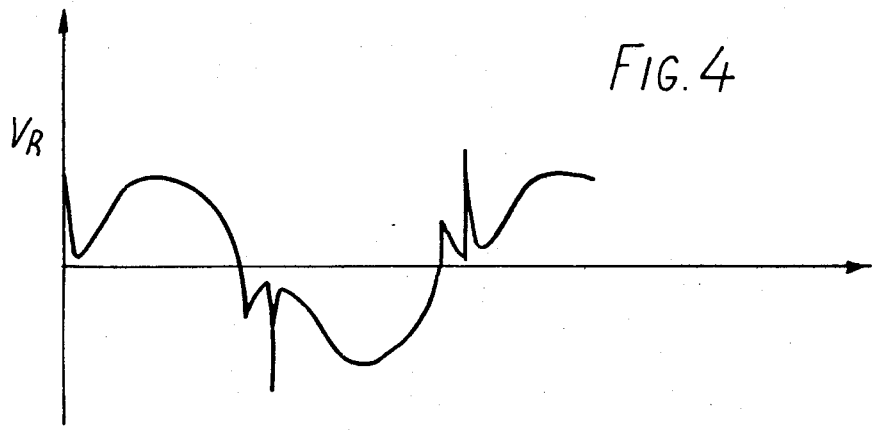
FIG. 4 shows the resistive or in-phase component $V_R$ of the weld voltage $V_W$, as it appears at the output of the summator 19 or of the amplifier 21.

The integrator 36 is reset at the end of each half-cycle of the welding current $I_W$. During the following half-cycle of weld current it integrates the search coil voltage $V_S$ which, as can be seen from FIG. 3, varies substantially symmetrically between positive and negative maxima during this time. The integrator is bidirectional, and its output accordingly falls to the low value represented by the reference signal at terminal 39 at substantially the same time as the welding current $I_W$ decays naturally to zero. Accordingly, the pulses produced on the line 31 by the items 36 to 40 are correctly located (in time) at the beginning of the periods of phase angle control, as required for the operation of the gain compensation circuit previously described.

A third monitoring circuit embodying the invention, shown in FIG. 6, relies for its operation upon the fact that, since both of the reactive voltage components of $V'_W$ are proportional to the rate of change of magnetic flux, when $V'_W$ is integrated they will produce an output proportional to the magnetic flux and so will disappear when the integration is taken over one complete half-cycle, i.e. between zero flux conditions. Therefore, by integrating $V'_W$ with respect to time over each pulse of the weld current, a voltage signal can be obtained which is substantially free of the effects of any reactive component and is therefore influenced only by the resistive or in-phase component $V_R$. Moreover, the signal is already in the integral form ($\int V_R\, dt$) required for can rejection and/or any other indication or control function which requires a measure of the electrical energy expended per nugget.

Referring now FIG. 6, the third monitoring circuit has a differential amplifier 41 arranged to amplify the monitored weld voltage $V'_W$. A bidirectional integrator 42, that is, an integrator responsive in different senses to positive and negative-going input signals, is connected to the output of the amplifier 41 for generating the signal representative of $\int V_R\, dt$ on a line 43. This signal, after the final absolute values of its component half-cycles have been sampled and held by sample and hold circuit 29 with associated capacitor 9, may be used by a can rejection apparatus 25 in the manner previously described. A conventional resetting circuit 44, identical to the resetting circuit 28 of FIG. 1, is controlled by a signal on an incoming line (unnumbered) so as to reset the bidirectional integrator 42 to zero after each half-cycle of the weld current.

Figure 1:
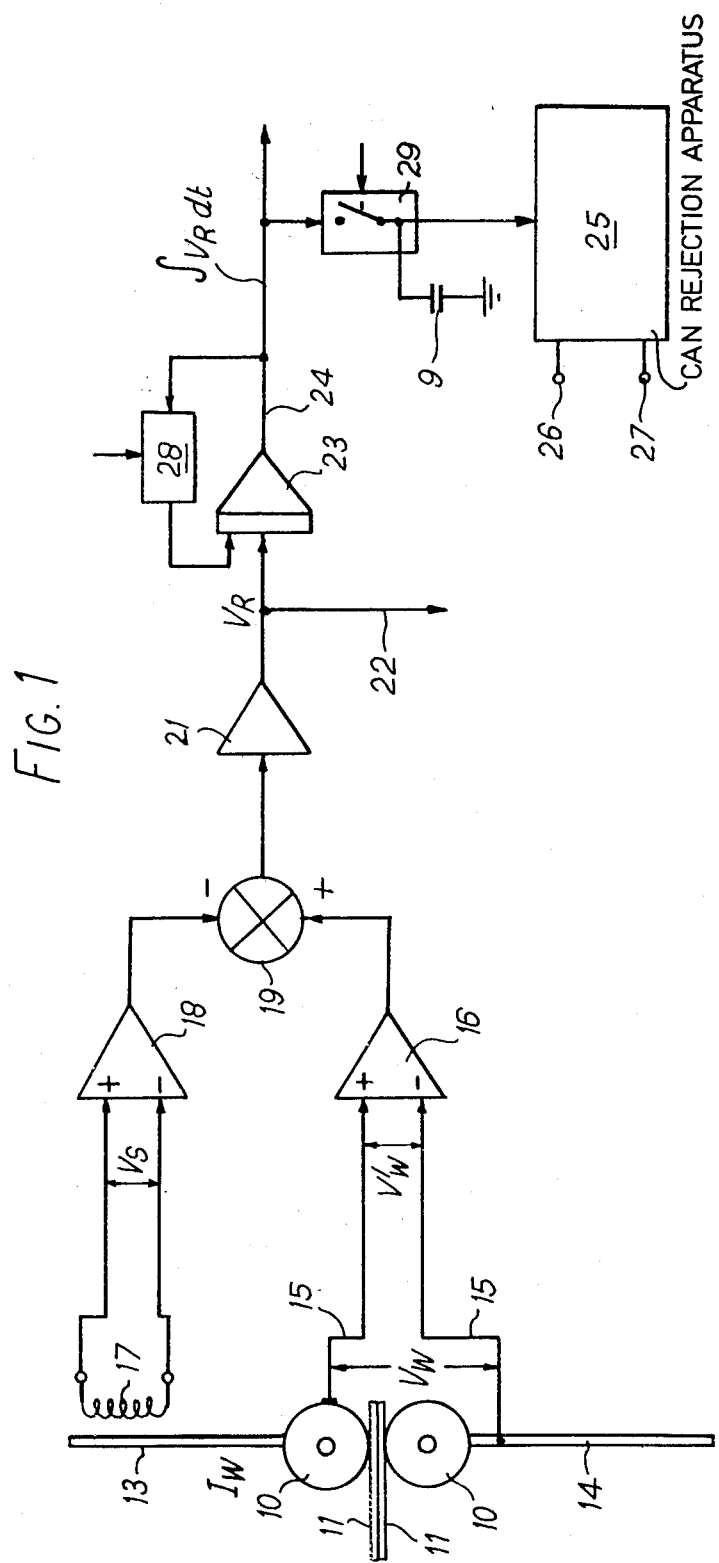
Figure 2:
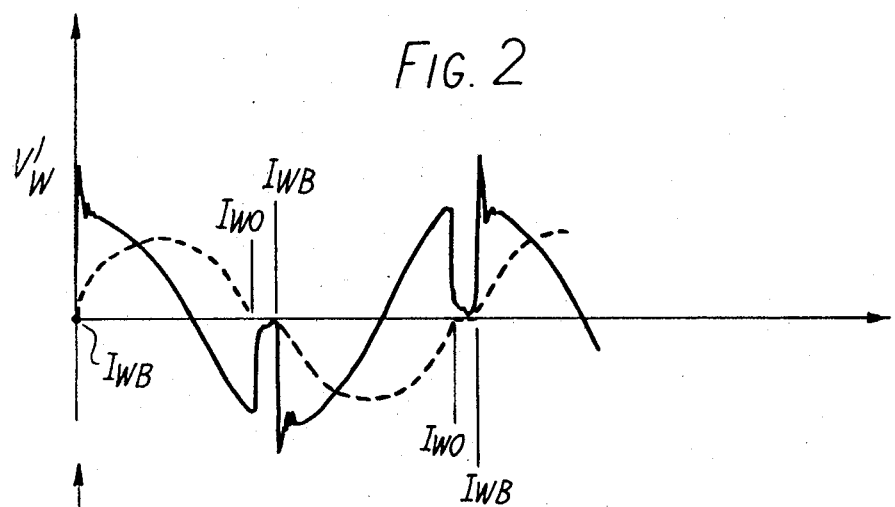

It will be noted that, whereas the embodiments of FIGS. 1 and 5 provide a signal representative of the resistive or in-phase component $V_R$ of the weld voltage, no such $V_R$ dependent signal is available from the monitoring circuit of FIG. 6.

The invention is not to be considered as limited to the welding of seams on tubular can bodies using wheel electrodes, but may have application to welding apparatus for other applications. Moreover, many variations and modifications of the monitoring circuits are possible within the scope of the appended claims.

I claim:

1. A monitoring circuit for monitoring the electrical energy expended in forming a weld nugget during one half-cycle of an a.c. resistance welding apparatus, which comprises first means for deriving a voltage in quadrature phase relation to the resistive component in-phase with the welding current, second means for deriving a monitored weld voltage which inherently contains a significant reactive component due to electromagnetic effects, and summing means for summing the quadrature voltage and the monitored weld voltage in such manner that the reactive component of the monitored weld voltage is substantially cancelled by the quadrature voltage, and for producing a voltage output signal representative of their sum, said output signal being thereby representative substantially only of the resistive or in-phase component of the weld voltage.

2. A circuit according to claim 1, wherein the first means comprise a search coil arranged to provide an signal representative of the welding current.

3. A circuit according to claim 2, which includes first and second amplifiers operative respectively upon the monitored weld voltage and said signal representative of the welding current, and the summing means being responsive to the outputs of the amplifiers.

4. A circuit according to claim 3, which includes gain control means arranged for controlling the gain of at least one of the first and second amplifiers.

5. A circuit according to claim 4, wherein the gain control means is arranged to repeatedly control the gain of the second amplifier in the sense to remove any residual of said voltage output signal which may exist at the ends of the half-cycles of welding current.

6. A circuit according to claim 5 wherein the gain of the second amplifier is controlled in response to the output of a sample and hold circuit operative to sample the values of the voltage output signal existing at the ends of the half-cycles of the welding current, and to hold the values for the gain control of the second amplifier.

7. A circuit according to claim 6, wherein the gain control means includes a comparator by which the output of the sample and hold circuit is compared with a reference signal.

8. A circuit according to any preceding claim, including an integrator arranged for integrating the voltage output signal with respect to time and for producing a further output signal which is representative of the integral of the voltage output signal and accordingly of the electrical energy expended during welding.

9. A circuit according to claim 8, which includes means responsive to the further output signal for producing an indication signal whenever the further output signal falls outside predetermined upper and lower limiting values.

10. A circuit according to claim 9, wherein the said means is arranged to control movement of the welded article in response to the indication signal.

11. A monitoring circuit for monitoring the electrical energy expended in forming a weld nugget during one half-cycle of an a.c. resistance welding apparatus, comprising conductor means, adapted to be connected to welding electrodes engaging work to be welded, for providing a monitored weld voltage signal which is out-of-phase with the welding current because of distributed circuit inductance between the points being monitored and of voltage electromagnetically induced in the conductor means, and means for integrating said monitored weld voltage signal over said one half-cycle to produce an output signal representative of the integral of that component of the monitored weld voltage signal which is in-phase with the welding current over said half-cycle.

12. A circuit according to claim 11, which includes means responsive to the output signal for producing an indication signal whenever the output signal falls outside predetermined upper and lower limits.

13. A circuit according to claim 12, wherein the said means is arranged to control movement of the welded article in response to the indication signal.

14. An a.c. resistance welding apparatus for the longitudinal seams of tubular bodies for cans, which includes first and second electrodes for contacting opposed parts of a said tubular body to be welded together, supply connections connected to the electrodes for supplying the same with a.c. electrical current, a monitoring circuit for monitoring the weld voltage across said electrodes and for producing an output signal representative of the electrical energy expended during each half-cycle of the welding current, said monitoring circuit being effective to produce, as said output signal, a signal representative of the integral with respect to time of substantially only the resistive or in-phase component of the weld voltage.

15. An apparatus according to claim 14 which includes means responsive to the output signal for segregating any said tubular bodies having a said output signal outside predetermined upper and lower limits from said tubular bodies of which the output signals are within said limits.

* * * * *